(12) United States Patent
Callender et al.

(10) Patent No.: US 10,117,164 B2
(45) Date of Patent: Oct. 30, 2018

(54) METHOD AND SYSTEM FOR INTER-FREQUENCY OR INTER-RAT CELL RESELECTION

(75) Inventors: Christopher Peter Callender, Church Crookham Fleet (GB); Harri Aatos Jokinen, Pertteli (FI); Leonardo Provvedi, Eastleigh (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 1113 days.

(21) Appl. No.: 12/431,619

(22) Filed: Apr. 28, 2009

(65) Prior Publication Data

US 2010/0081438 A1   Apr. 1, 2010

Related U.S. Application Data

(60) Provisional application No. 61/048,524, filed on Apr. 28, 2008.

(51) Int. Cl.
| | |
|---|---|
| *H04W 36/00* | (2009.01) |
| *H04W 48/18* | (2009.01) |
| *H04W 48/16* | (2009.01) |
| *H04W 48/20* | (2009.01) |

(52) U.S. Cl.
CPC .......... *H04W 48/18* (2013.01); *H04W 48/16* (2013.01); *H04W 48/20* (2013.01)

(58) Field of Classification Search
CPC .......................... H04W 36/0083; H04W 36/30
USPC ................................................ 455/436, 453
See application file for complete search history.

(56) References Cited

U.S. PATENT DOCUMENTS

| | | | |
|---|---|---|---|
| 6,510,146 B1 | 1/2003 | Korpela et al. | |
| 7,529,560 B2 * | 5/2009 | Nielsen et al. | 455/552.1 |
| 2001/0031638 A1 * | 10/2001 | Korpela et al. | 455/449 |
| 2007/0004445 A1 | 1/2007 | Dorsey et al. | |

(Continued)

FOREIGN PATENT DOCUMENTS

| | | |
|---|---|---|
| CN | 1409933 A | 4/2003 |
| CN | 1826820 A | 8/2006 |

(Continued)

OTHER PUBLICATIONS

"3rd Generation Partnership Project, Technical Specification Group Radio Access Network, User Equipment (UE) procedures in idle mode and procedures for cell reselection in connected mode", Release 9, 3GPP TS 25.304, v9.1.0, Mar. 2010, pp. 1-50.

(Continued)

*Primary Examiner* — Charles Shedrick
(74) *Attorney, Agent, or Firm* — Squire Patton Boggs (US) LLP

(57) ABSTRACT

A method for reselection of a cell in a wireless network comprises a) detecting that a level of a current serving cell is below a threshold defined for the current serving cell; b) determining the availability of a target cell at a lower or equal priority layer than the current serving cell; c) determining, for at least one available target cell at a lower or equal priority layer than the current serving cell, whether the available target cell has a level above a threshold defined for the available target cell; and d) selecting the available target cell if the determination at c) is affirmative; if the determination at c) is negative, using a hysteresis to select any target cell with a level better than the serving cell.

15 Claims, 9 Drawing Sheets

(56) References Cited

U.S. PATENT DOCUMENTS

| | | | |
|---|---|---|---|
| 2008/0076428 A1* | 3/2008 | Jagadeesan et al. | 455/436 |
| 2008/0220784 A1* | 9/2008 | Somasundaram et al. | 455/437 |
| 2009/0017823 A1* | 1/2009 | Sachs et al. | 455/437 |
| 2010/0216469 A1* | 8/2010 | Yi et al. | 455/435.3 |
| 2011/0076957 A1* | 3/2011 | Kunz et al. | 455/67.11 |
| 2011/0105119 A1* | 5/2011 | Bienas et al. | 455/436 |

FOREIGN PATENT DOCUMENTS

| | | |
|---|---|---|
| CN | 1852559 A | 10/2006 |
| CN | 1941962 A | 4/2007 |
| CN | 1965605 A | 5/2007 |
| RU | 2291568 C1 | 1/2007 |
| WO | 98/36591 A1 | 8/1998 |
| WO | 2005/122621 A1 | 12/2005 |
| WO | 2006/128479 A1 | 12/2006 |

OTHER PUBLICATIONS

"3rd Generation Partnership Project, Technical Specification Group GSM/EDGE Radio Access Network, Radio subsystem link control", Release 8, Global System for Mobile Communications, 3GPP TS 45.008, v8.4.0, Sep. 2009, pp. 139.

"3rd Generation Partnership Project, Technical Specification Group Radio Access Network, Evolved Universal Terrestrial Radio Access (E-UTRA), User Equipment (UE) procedures in idle mode", Release 8, 3GPP TS 36.304, v8.1.0, Mar. 2008, pp. 1-29.

International Preliminary Report on Patentability received for corresponding Patent Cooperation Treaty Application No. PCT/FI2009/050336, dated Nov. 11, 2010, 9 pages.

International Search Report and Written Opinion received for corresponding Patent Cooperation Treaty Application No. PCT/FI2009/050336, dated Aug. 31, 2009, 14 pages.

Second Office Action dated Aug. 16, 2013, issued in corresponding Chinese Application No. 200980124033.4.

Australian Office Action, dated Dec. 13, 2012; Issued on corresponding Application No. 2009241985.

Office Action dated Jun. 18, 2012 corresponding to Russian Patent Application No. 2010148319/08 and English translation thereof.

Office Action dated Feb. 26, 2013 issued in corresponding to Chinese Patent Application No. 200980124033.4.

European Search Report issued in corresponding EP Application No. 09738279.0, dated Oct. 5, 2016.

T-Mobile et al., "CSG and idle mode mobility", 3GPP Draft, TSG RAN #60bis, R2-080002, Jan. 14-18, 2008. pp. 1-28.

Nokia et al., "E-UTRA Inter-Frequency Cell Reselection Aspects", 3GPP Draft, TSG-RAN WG2 Meeting # 60, R2-074876, Nov. 5-9 2007. pp. 1-10.

Nokia et al., "Performance Requirements and Text Proposal for Idle reselection in 36.133", 3GPP Draft, TSG-RAN WG4, R4-080772, meeting #46bis. Mar. 30-Apr. 4, 2008. pp. 1-13.

Nokia Siemens Networks et al., "Inter-RAT Cell Reselection From GERAN", GR070017, 3GPP Draft, RAN-GERAN, Sep. 27-28, 2007. pp. 1-13.

Indian Office Action dated Apr. 27, 2017, issued in corresponding Indian Application No. 7589/CHENP/2010.

* cited by examiner

METHOD AND SYSTEM FOR INTER-FREQUENCY OR INTER-RAT CELL RESELECTION

CROSS-REFERENCE TO RELATED APPLICATIONS

This patent application claims priority under 35 U.S.C. § 119(e) from Provisional Patent Application No. 61/048,524 filed Apr. 28, 2008, the disclosure of which is incorporated by reference herein in its entirety.

FIELD OF INVENTION

This invention relates to wireless communication. In particular, the present invention relates to the cell selection for a wireless device for communication in a wireless network.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
RAT radio access technology
RRC radio resource control
RSCP received signal code power
RSRP reference signal received power
RX received
UE user equipment In wireless communication, different wireless systems are available to provide different types of services and capabilities. Such wireless communication systems include wireless local area networks and cellular networks, among others. The cellular networks may include a variety of network types, such as Universal Terrestrial Radio Access Network (UTRAN), GSM/EDGE Radio Access Network (GERAN).

Cellular networks typically include multiple cells which allow a mobile user device to communicate while moving through the network. Often, a user device may be located in a geographic region serviced by multiple networks. The multiple networks may be arranged by their respective operators to be inter-operative. In this regard, to provide improved connection, one network operator may have an arrangement with another network operator to allow its users to switch to the other network if required avoid a disconnection from the network.

In this regard, inter-frequency and inter-RAT (radio access technology) cell reselection is performed according to agreed-upon priority algorithms. For example, the cell reselection algorithm for Evolved Universal Terrestrial Radio Access (E-UTRA) is defined in the current specification (3GPP TS 36.304), which is available at www.3gpp.org/ftp/Specs/html-info/36304.htm.

The current cell reselection methods have shortcomings which are addressed and improved by embodiments of the present invention.

As used herein, the phrase "priority layer" is used in a generic way to indicate either a RAT, or a frequency layer of RAT, or a group of frequencies of a RAT (e.g. a particular band).

SUMMARY OF THE INVENTION

In one aspect, the invention relates to a method for reselection of a cell in a wireless network, the method comprising a) detecting that a level of a current serving cell is below a low threshold defined for the current serving cell; b) determining the availability of a target cell at a lower or equal priority layer than the current serving cell; c) determining, for at least one available target cell at a lower or equal priority layer than the current serving cell, whether the available target cell has a level above a high threshold defined for the available target cell; and d) selecting the available target cell if the determination at c) is affirmative. In one embodiment, c) uses a hysteresis for making the determination. In one embodiment, if the determination at a) is affirmative and c) is negative (i.e., all the target cells are below the high threshold), the method further comprises using a hysteresis to select a target cell above a low threshold defined for the target cell priority layer. In one embodiment, the following are performed before a): determining the availability of a target cell at a higher priority layer than the current serving cell; determining, for at least one available target cell at a higher priority layer than the current serving cell, whether the available target cell has a level above a high threshold defined for the available target cell; and selecting the available target cell if the determination the available target cell has a level above a high threshold defined for the available target cell.

In one embodiment, the following are performed: determining the availability of a target cell of any priority layer; determining, for at least one available target cell, whether the available target cell has a level, relative to the low threshold defined for that cell, which is higher by an hysteresis H than the level of the serving cell relative to the low threshold defined for the serving cell; and selecting the available target cell with the highest level among those for which the determination above is affirmative.

In another embodiment, the following are performed: determining the availability of a target cell of any priority layer; determining, for at least one available target cell, whether the available target cell has a level relative to the low threshold, which is higher by an hysteresis H than the level of the serving cell relative to the low threshold defined for the serving cell; and selecting the available target cell with the highest priority among those for which the determination above is affirmative.

In another aspect, an apparatus comprises a processor and a memory unit communicatively connected to the processor. The memory unit includes a) computer code for detecting that a level of a current serving cell is below a low threshold defined for the current serving cell; b) computer code for determining the availability of a target cell at a lower or equal priority layer than the current serving cell; c) computer code for determining, for at least one available target cell at a lower or equal priority layer than the current serving cell, whether the available target cell has a level above a high threshold defined for the available target cell; and d) computer code for selecting the available target cell if the determination at c) is affirmative.

In another aspect of the invention, a computer program product, embodied on a computer-readable medium, comprises a) a computer code for detecting that a level of a current serving cell is below a low threshold defined for the current serving cell; b) a computer code for determining the availability of a target cell at a lower or equal priority layer than the current serving cell; c) a computer code for determining, for at least one available target cell at a lower or equal priority layer than the current serving cell, whether the available target cell has a level above a high threshold defined for the available target cell; and d) a computer code for selecting the available target cell if the determination at c) is affirmative.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF THE VARIOUS EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As noted above, the cell reselection algorithm for E-UTRA is defined in the current specification (3GPP TS 36.304, version 8.1.0), which is available at www.3gpp.org/ftp/Specs/html-info/36304.htm. In accordance with this specification, a user device camped on a cell regularly searches for a better cell according to the defined cell reselection criteria. If a better cell is found, that cell is reselected.

The various cells available to the user device are assigned priorities. The above-noted specification provides that "[a]bsolute priorities of different inter-RAT frequencies or E-UTRAN inter-frequencies may be provided to the UE in the system information and optionally in the RRC message releasing RRC connection by the RPLMN." If priorities are assigned through dedicated signaling, the user device ignores the priorities provided in the system information (i.e. broadcast signalling).

An exemplary selection criteria for a cell is defined as:

$$Srxlev = Q_{rxlevmeas} - Qrxlevmin - Pcompensation$$

where: Srxlev is cell selection RX level value (dB)
$Q_{rxlevmeas}$ is the measured cell RX level value (e.g., RSRP for a E-UTRAN cell, RSCP for a UTRAN cell etc.)
Qrxlevmin is the minimum required RX level in the cell (dBm).

For definition of Pcompensation, as well as other parameters, reference may be made to the current specification (3GPP TS 36.304) described above, which is available at www.3gpp.org/ftp/Specs/html-info/36304.htm.

For a cell to be selected, the selection criteria must be greater than 0, or Srxlev>0.

Figure 1:
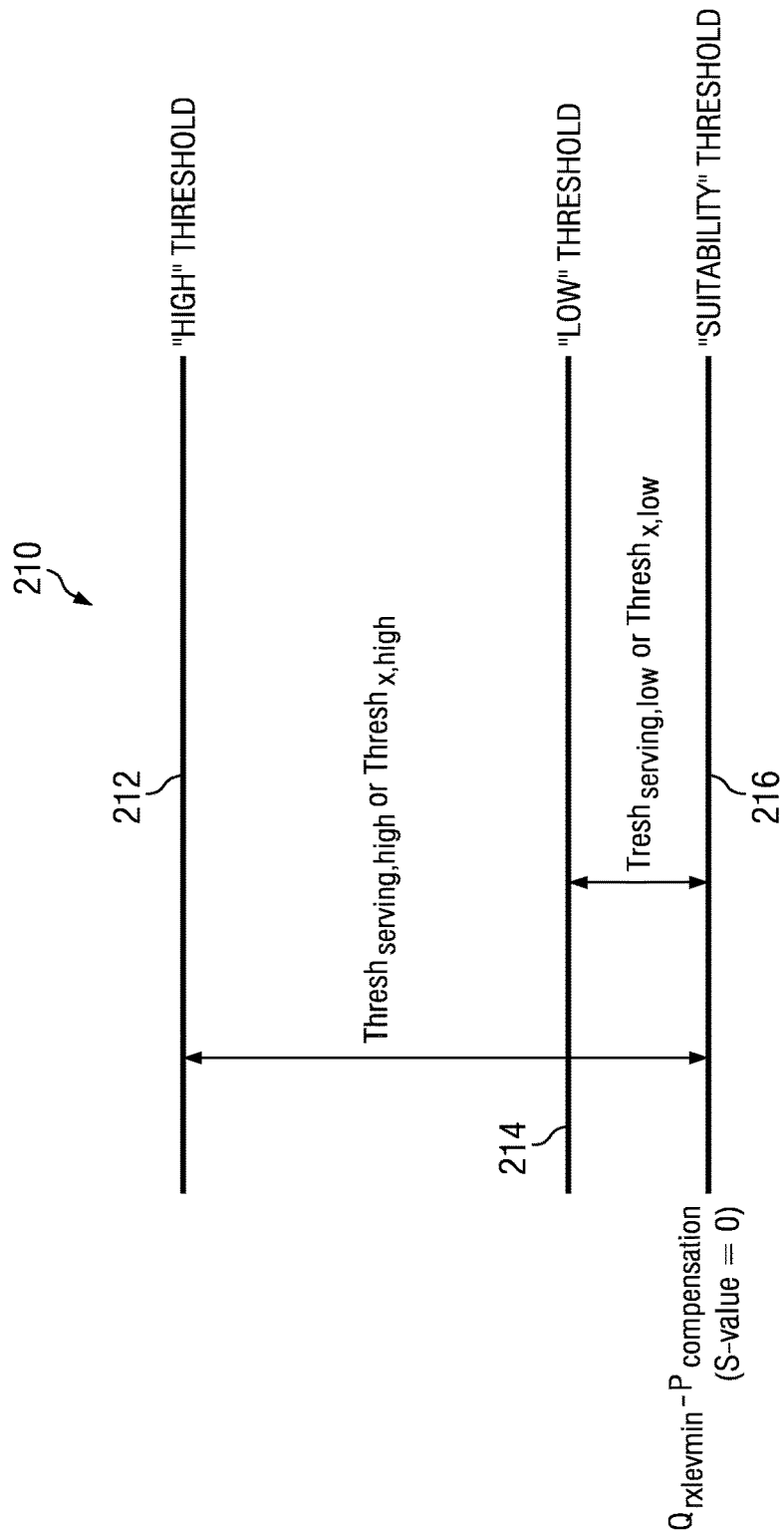
FIG. 1 illustrates the thresholds for an exemplary cell 210 for cell reselection.

Referring now to FIG. 1, the thresholds for an exemplary cell 210 are illustrated. In this regard, each cell is assigned a low threshold 214, a high threshold 212 and a suitability threshold 216.

In accordance with current methods, such as that described in the above-noted specification, the user device reselects another cell on a higher priority layer if the level in the other cell is higher than the high threshold defined for that cell. The actual level of the serving cell is not taken into consideration.

Also in accordance with current methods, if the level of the serving cell falls below the low threshold, the user device selects a cell with a lower priority layer if this other cell is above the low threshold.

Figure 2:
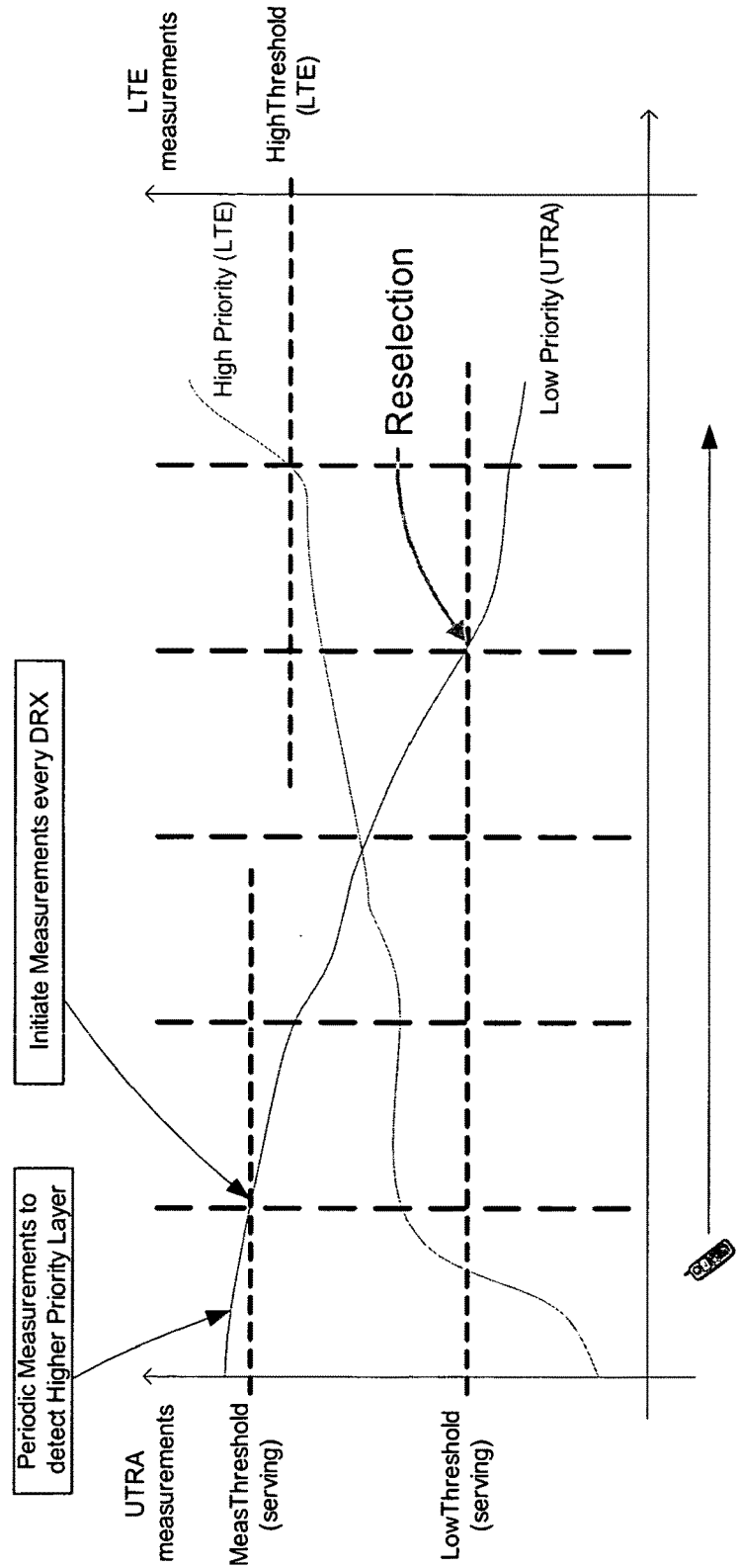
FIG. 2 is a graph illustrating the levels of two cells available to a user device.

However, in this case (i.e., where the reselection is triggered by the serving cell falling below the low threshold), a cell in a higher priority layer at a level between the high and low thresholds is never selected. Thus, the user device would select a cell with a lower priority layer, even if the cell is at a level only marginally above the low threshold, rather than cell with a higher priority layer that may be only marginally below the high threshold. This is clearly illustrated in the example shown in FIG. 2. At the point of reselection (i.e., where the serving cell falls below the low threshold), a cell on a higher priority layer is available just below the high threshold. This cell would not be selected by the user equipment.

Further, current cell reselection methods do not provide any hysteresis built in for inter-RAT reselection scenarios. Consider the case where both the serving cell and the target cell in a lower priority RAT are close to their respective lower thresholds. In this case, if the serving RAT drops marginally below the low threshold, an inter-RAT reselection would occur immediately. Selection of the previous cell would not happen because the original RAT now is a higher priority RAT, but only a small fluctuation in the level of the new cell could make the user device reselect to the original RAT, thus generating a ping-pong behavior between the two cells.

Embodiments of the present invention address these problems and provide effective solutions.

In accordance with one embodiment of the present invention, the high threshold is used for accepting reselection to a lower priority layer. The use of the higher threshold guarantees that reselection is not triggered unless service at the target frequency or RAT is good enough to avoid an immediate reselection back. In one implementation, a hysteresis mechanism is introduced in the cell reselection process to avoid the ping-pong behavior described above.

In another embodiment, when the serving cell falls below the lower threshold and no other cell in another priority layer exists above the high threshold (i.e., neither lower priority nor higher priority exists above the high), another mechanism to provide hysteresis could be introduced. In this regard, the user device does not reselect another RAT if it has insufficient margin to the point where reselection is triggered, that is relative to the low threshold. In this case, when the serving RAT level drops below the serving RAT low threshold, if no better other RAT is available according to the priority based reselection rules, the user device is allowed to reselect another RAT if the level of that RAT, relative to the low threshold (or relative to the high threshold) defined for that RAT exceeds the level of the serving RAT, relative to the low threshold (or the high threshold) defined for the serving RAT, by a specific hysteresis. The specific hysteresis may be either fixed or defined by a network controlled parameter. In this regard, the user device is able to avoid approaching levels where service may be lost even if suitability is fulfilled by providing hysteresis between different cells. It will be appreciated by those skilled in the art that, while the discussion herein at times refers to a level relative to the low threshold of a cell, embodiments using a level relative to the high threshold are also contemplated within the scope of the present invention.

Thus, in accordance with embodiments of the present invention, cell reselection is performed if the selection criteria of the target cell of a higher priority layer is greater than the high threshold during a predefined time period. In this case, the user device considers the available cells for reselection in a decreasing order of priority and, for cells of the same priority layer, in decreasing order of selection criteria.

Further, in accordance with embodiments of the present invention, cell reselection is performed if the level of the serving cell falls below the low threshold, and all available cells at the serving frequency are below the low threshold; in this case, the user device considers the inter-RAT and inter-frequency cells for reselection in a specific order. In this regard, the reselection is based on the first such cell that satisfies the following criteria:

cells of a lower priority layer whose selection criteria is greater than the high threshold during a pre-selected time interval; these cells are considered in decreasing order of priority and, for cells of the same priority layer, in decreasing order of selection criteria;

if no cells satisfy the criterion above, inter-RAT or inter-frequency cells for which, during a predetermined time interval, the selection criteria is lower than the high threshold but greater than the low threshold and for which the difference between the selection criteria and the low threshold is greater than the difference between the selection criteria and low threshold for the serving cell by at least a specific hysteresis H; these cells are considered in decreasing order of priority and, for cells of the same priority layer, in decreasing order of selection criteria.

Figure 3:
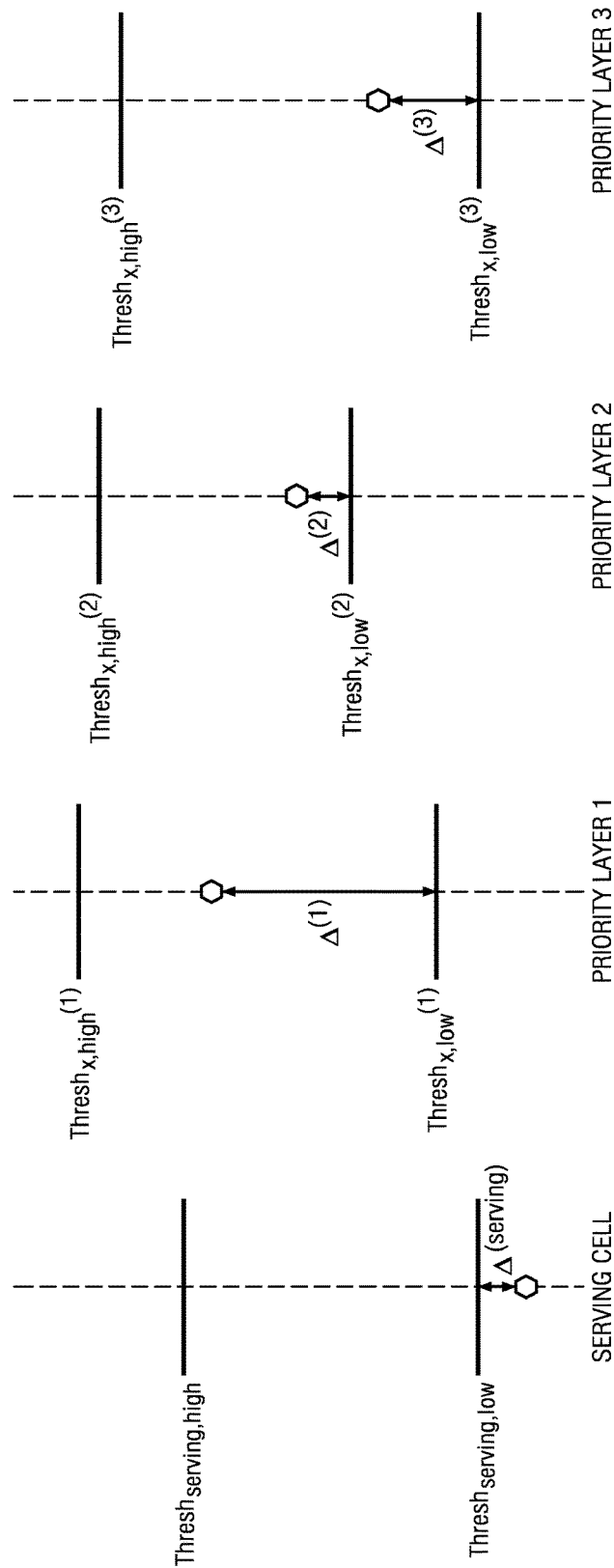
FIG. 3 illustrates an exemplary cell reselection according to an embodiment of the present invention.

Referring now to FIG. 3, an exemplary cell reselection according to an embodiment of the present invention is illustrated. In the embodiment illustrated in FIG. 3, the level of each priority layer monitored by the user device falls between the low threshold and the high threshold. $\Delta^{(i)}$ represents the level of the priority layer (i) relative to the low threshold defined for that priority layer:

$$\Delta^{(i)} = (\text{level of priority layer } i) - (\text{lower threshold of priority layer } i).$$

In other embodiments, the difference could be taken from the high threshold.

A reselection is triggered when $\Delta^{(serving)}$ for the serving cell becomes negative, as illustrated by the condition of the serving cell in FIG. 3, where the level of the serving cell has fallen below the low threshold.

The user device reselects a priority layer only if its level, relative to the low threshold (or, in other embodiments, the high threshold), defined for that layer exceeds the level of the serving RAT, relative to the low threshold (or the high threshold) defined for the serving RAT, by a specific hysteresis, which may be either fixed or defined by a network controlled parameter. Thus, the user device reselects a priority layer i only if $(\Delta^{(i)} - \Delta^{(serving)}) > H$, where H is the hysteresis.

For example, in the scenario illustrated in FIG. 3, assuming that the only priority layer to satisfy this condition is priority layer 1, the user device reselects priority layer 1, regardless of the absolute priority of each layer. Note that the hysteresis H is not shown in FIG. 3.

If more than one priority layer satisfies the condition $(\Delta^{(i)} - \Delta^{(serving)}) > H$, the user device can reselect the priority layer with the highest priority. In other embodiments, the user device could reselect the priority layer for which the level is highest.

If none of these quantities is higher than the hysteresis H (e.g., if the level of all priority layers is close to the low threshold), then the user device continues camping on the serving cell. Since the reselection does not get triggered because of the hysteresis, the serving cell is not actually a lot below the low threshold. In this case there may not be urgency for reselection, specifically not towards another layer for which the signal level is only marginally better. This assumes that the level of the low threshold of the serving cell is above the suitability level (i.e. the level for which Srxlev=0), so the terminal can still camp on a cell and receive service even if its level is below the low threshold of the serving cell (provided that Srxlev>0).

Further, in the case where no neighboring cells are above the low threshold, then the UE could consider the priority layers that meet the S criteria and either reselect the one with the highest priority or perform relative ranking among them and reselect to the strongest one (i.e. the one with the highest value of Srxlev).

Figure 4A:
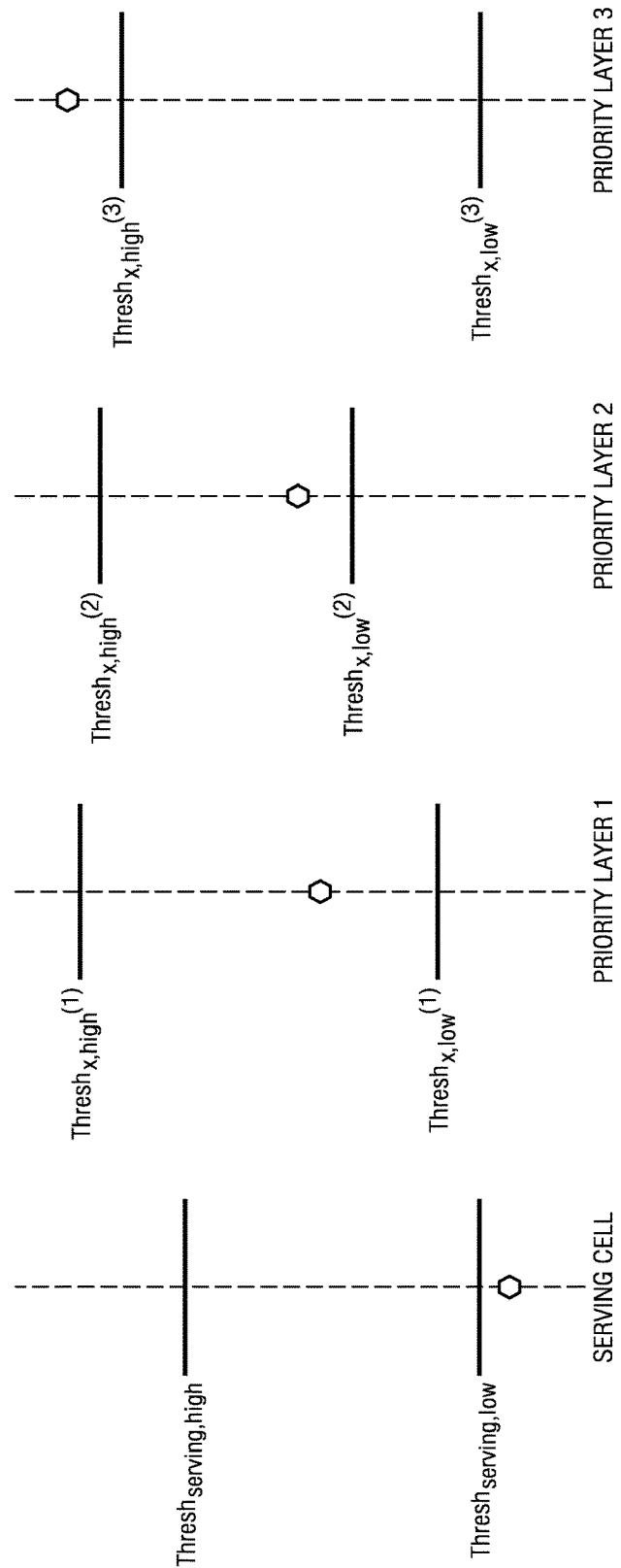
FIGS. 4A and 4B illustrate exemplary cell reselection methods according to embodiments of the present invention.
Figure 4B:
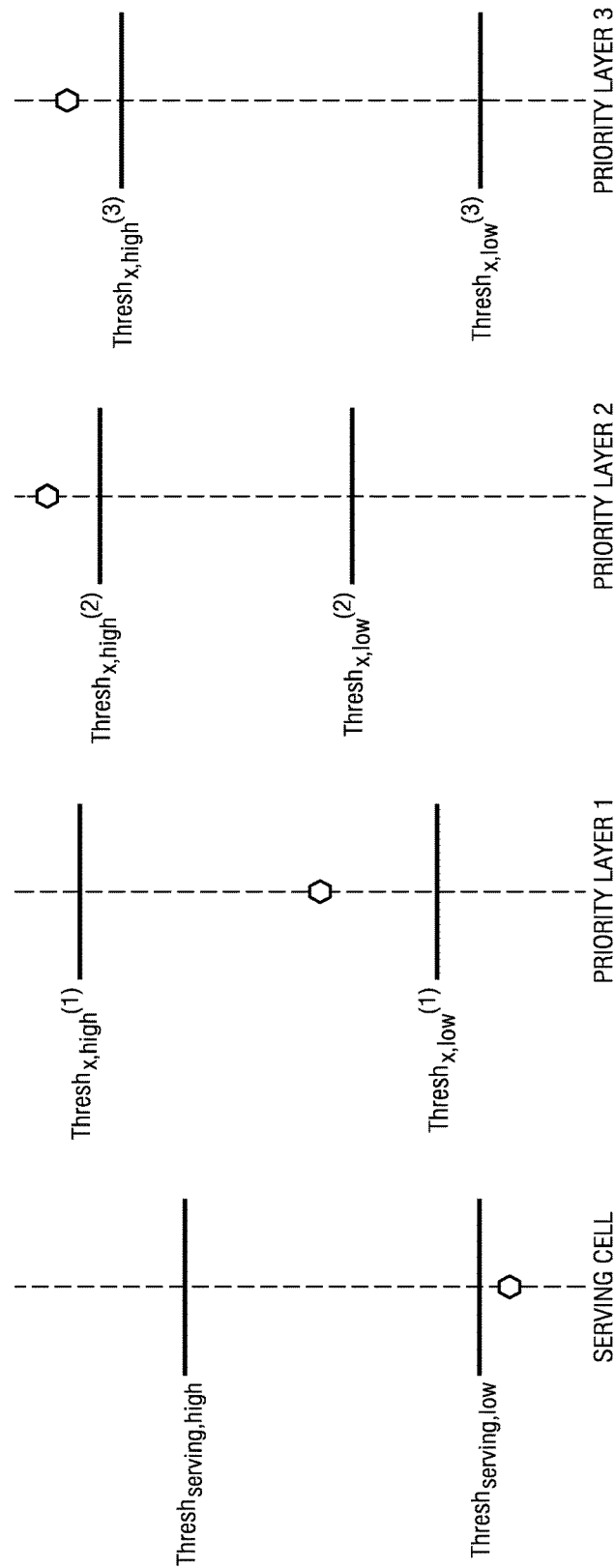

Referring now to FIGS. 4A and 4B, exemplary cell reselection methods according to embodiments of the present invention are illustrated. Referring first to FIG. 4A, as the level of the serving cell falls below the low threshold, the user device reselects priority layer 3, which is the only one assumed to be above the high threshold.

Referring now to FIG. 4B, on the other hand, where two priority layers are above the high threshold, the actual priorities of the different priority layers are relevant. In this regard, the user device chooses the priority layer with the highest absolute priority among those that are above the high threshold.

Figure 8:
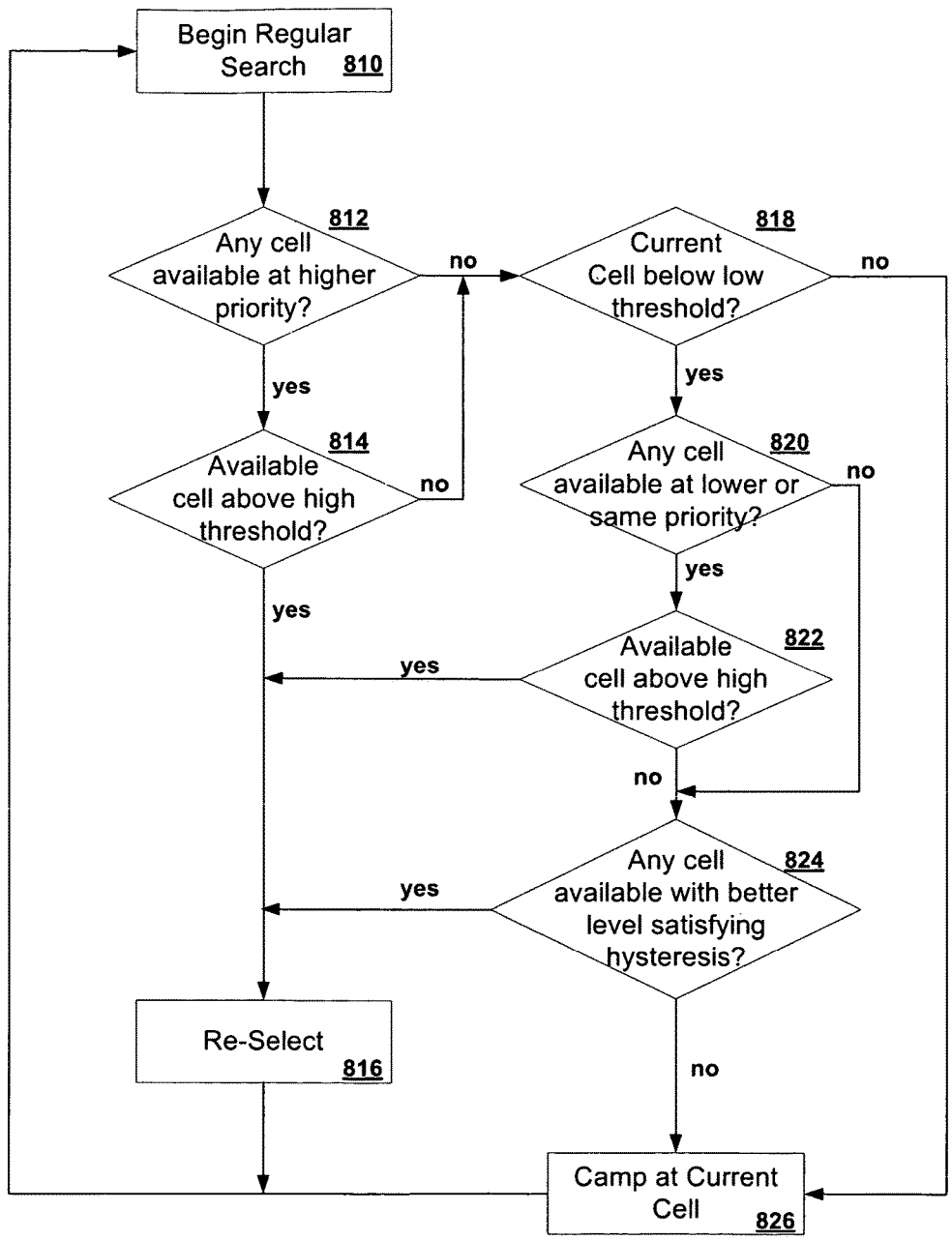
FIG. 8 is a flow chart illustrating a cell reselection process according to an embodiment of the present invention.

Referring now to FIG. 8, a cell reselection process according to an embodiment of the present invention is illustrated. In the illustrated process, a user device conducts regular searches for available cells (block 810). The user device determines whether any cells at a higher priority layer are available (block 812). If such a cell is available, the process proceeds to block 814 and determines whether any of the available cells are above the high threshold. If an available cell is above the high threshold, the process proceeds to block 816 and selects that cell, and the process returns to block 810 and conducts its next regular search.

If, either at block 812 or 814, the determination is negative, the process proceeds to block 818 and determines whether the serving cell is below its low threshold. If the cell is not below its low threshold, the device camps at the serving cell (block 826). On the other hand, if the serving cell is below its low threshold, the device determines whether any cell at a lower or same priority layer is available (block 820). If no cell is available, the device proceeds to block 824. Otherwise, it determines whether the available cell is above its high threshold (block 822). If any available cell is above its high threshold, that cell is selected (block 816). Otherwise, the device proceeds to block 824 and determines whether any cell is available with a level above the hysteresis level better than the serving cell (block 824). In this regard, all cells, regardless of priority layer, may be considered. If no such cell is available, the device camps at the serving cell 826. If any cell is available with a level above the hysteresis level better than the serving cell, that cell is selected (block 816).

It will be appreciated by those skilled in the art that, while the flowchart of FIG. 8 describes various decision points, not all decision points illustrated in FIG. 8 are required for all embodiments of the invention. For example, a cell reselection process within the scope of the present invention may implement only the decision point of block 824, only the decision points of blocks 820 and 822, or the decision points in blocks 820, 822 and 824.

Thus, embodiments of the present invention provide solutions to the shortcomings of current cell selection or reselection methods.

Figure 5:
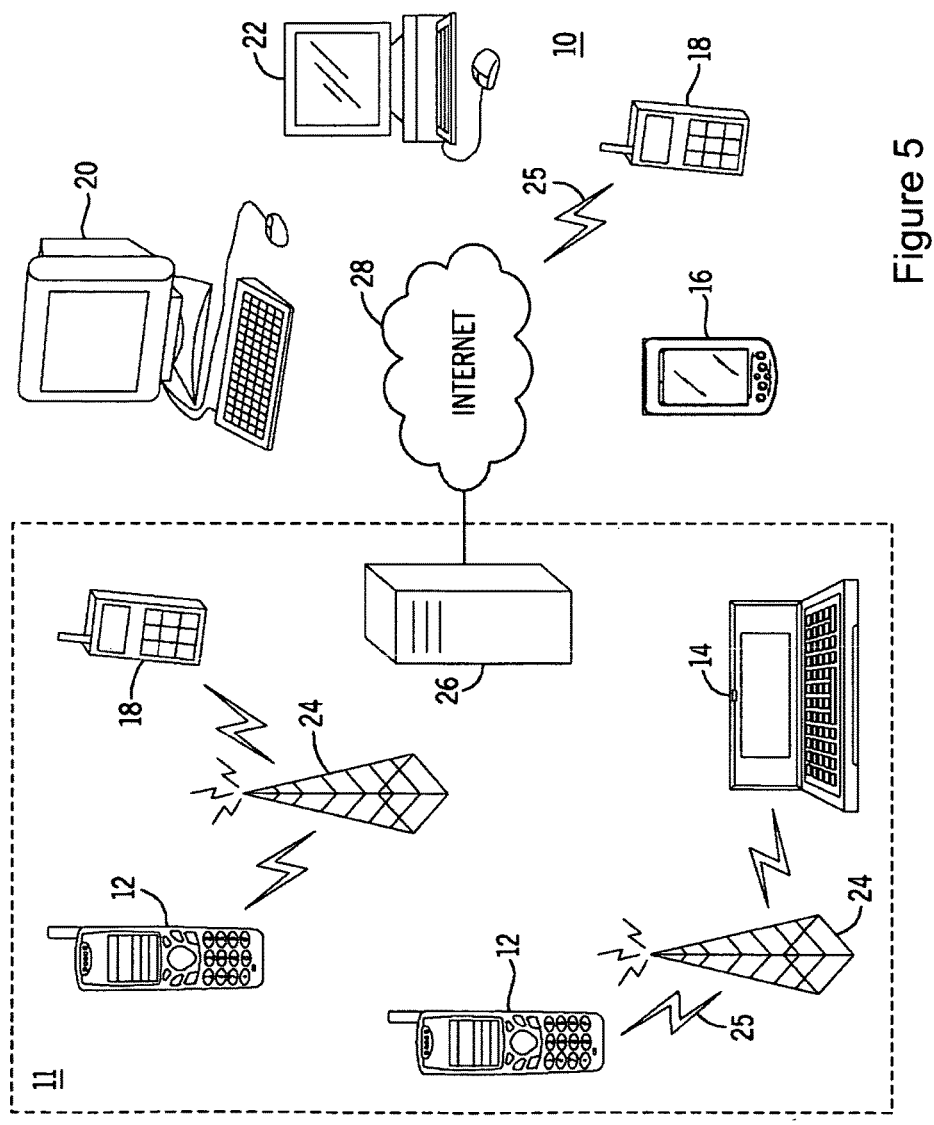
FIG. 5 is an overview diagram of a system within which various embodiments of the present invention may be implemented.

FIG. 5 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
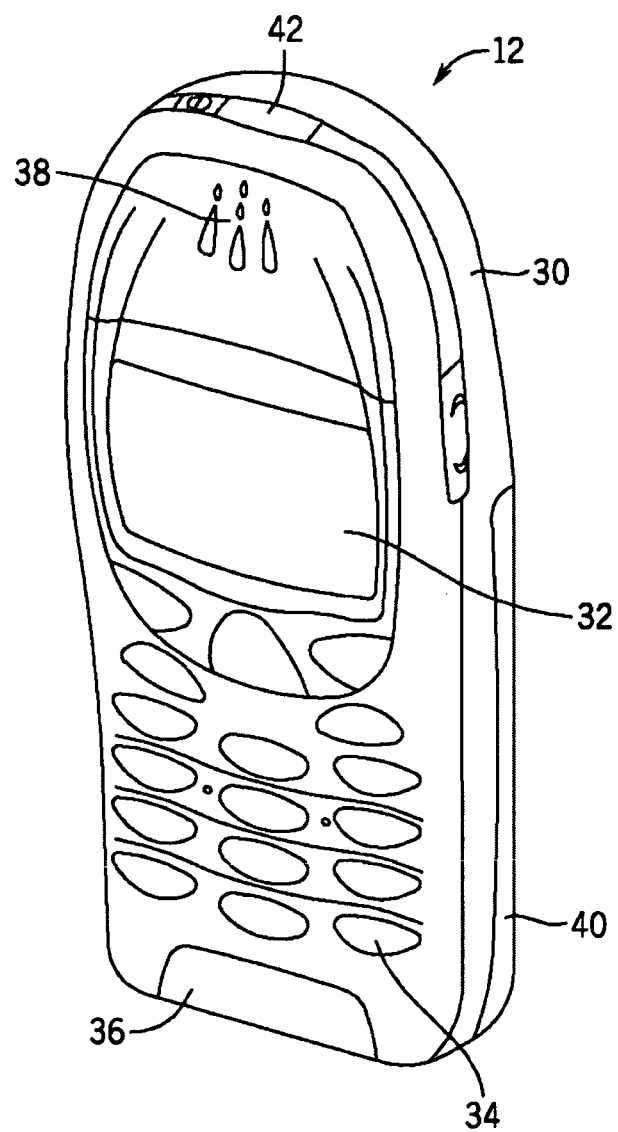
FIG. 6 illustrates a perspective view of an exemplary electronic device which may be utilized in accordance with the various embodiments of the present invention.
Figure 7:
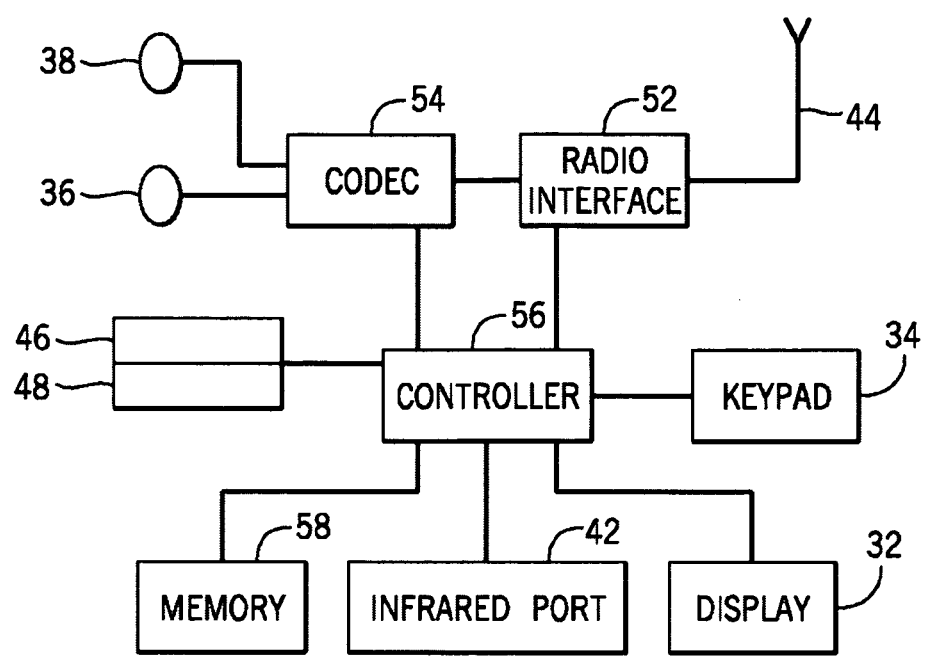
FIG. 7 is a schematic representation of the circuitry which may be included in the electronic device of FIG. 6.

FIGS. 6 and 7 show one representative electronic device 28 which may be used as a network node in accordance to the various embodiments of the present invention. It should be understood, however, that the scope of the present invention is not intended to be limited to one particular type of device. The electronic device 28 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for iterative reselection of a cell in a wireless network, the method comprising:
    a) detecting that a level of a current serving cell is below a threshold defined for the current serving cell;
    b) determining the availability of a target cell at a lower or equal priority layer than the current serving cell;
    c) determining, for at least one available target cell at a lower or equal priority layer than the current serving cell, whether the available target cell has a level above a threshold defined for the available target cell;
    d) selecting the available target cell when the determination at c) is affirmative;
    and, when the determination of c) is negative, then
    e) determining the availability of a target cell at any priority layer;
    f) determining, for at least one available target cell at any priority layer, whether the available target cell has a level higher by a hysteresis than the level of the serving cell; and
    g) selecting the available target cell when the determination at f) is affirmative,
    wherein the determination at c) is negative in at least one iteration.

2. The method of claim 1, wherein c) uses a hysteresis for making the determination.

3. The method of claim 1, wherein the following are performed before a):
    determining the availability of a target cell at a higher priority layer than the current serving cell;
    determining, for at least one available target cell at a higher priority layer than the current serving cell, whether the available target cell has a level above a threshold defined for the available target cell; and
    selecting the available target cell if the determination the available target cell has a level above said threshold for the available target cell.

4. The method of claim 1, wherein the level is the measured received signal power value.

5. The method of claim 4, wherein the measured received signal power value is adjusted by at least one offset value.

6. An apparatus, comprising:
    a processor; and
    at least one memory including computer program code, the at least one memory and the computer program code being configured, with the at least one processor, to cause the apparatus at least to:
    a) detect that a level of a current serving cell is below a threshold defined for the current serving cell;
    b) determine the availability of a target cell at a lower or equal priority layer than the current serving cell;
    c) determine, for at least one available target cell at a lower or equal priority layer than the current serving cell, whether the available target cell has a level above a threshold defined for the available target cell; and
    d) select the available target cell when the determination at c) is affirmative;
    and, when the determination at c) is negative, then the computer code controls the apparatus to
    e) determine the availability of a target cell at any priority layer;
    f) determine, for at least one available target cell at any priority layer, whether the available target cell has a level higher by a hysteresis than the level of the serving cell; and
    g) select the available target cell when the determination at f) is affirmative.

7. The apparatus of claim 6, wherein the determination of c) uses a hysteresis for making the determination.

8. The apparatus of claim 6, wherein the computer program code is configured to, before a) is executed:
    determine the availability of a target cell at a higher priority layer than the current serving cell;
    determine, for at least one available target cell at a higher priority layer than the current serving cell, whether the available target cell has a level above a threshold defined for the available target cell; and
    select the available target cell if the determination the available target cell has a level above said threshold defined for the available target cell.

9. The apparatus of claim 6, wherein the level is the measured received signal power value.

10. The apparatus of claim 9, wherein the measured received signal power value is adjusted by at least one offset value.

11. A computer program product comprising a non-transitory computer-readable medium bearing computer program code embodied therein for use with a computer, the computer program code comprising:
    a) a computer code for detecting that a level of a current serving cell is below a threshold defined for the current serving cell;
    b) a computer code for determining the availability of a target cell at a lower or equal priority layer than the current serving cell;
    c) a computer code for determining, for at least one available target cell at a lower or equal priority layer than the current serving cell, whether the available target cell has a level above a threshold defined for the available target cell;
    d) a computer code for selecting the available target cell when the determination at c) is affirmative; and
    when the determination of c) is negative, then
    e) determining the availability of a target cell at any priority layer;
    f) determining, for at least one available target cell at any priority layer, whether the available target cell has a level higher by a hysteresis than the level of the serving cell; and
    g) selecting the available target cell when the determination at f) is affirmative.

12. The computer program product of claim 11, wherein computer code of c) uses a hysteresis for making the determination.

13. The computer program product of claim 11, further comprising computer code to perform the following before a):
    determining the availability of a target cell at a higher priority layer than the current serving cell;
    determining, for at least one available target cell at a higher priority layer than the current serving cell, whether the available target cell has a level above a threshold defined for the available target cell; and selecting the available target cell if the determination the available target cell has a level above said threshold defined for the available target cell.

14. The computer program product of claim 11, wherein the level is the measured received signal power value.

15. The computer program product of claim 14, wherein the measured received signal power value is adjusted by at least one offset value.

* * * * *